United States Patent
Puchleitner et al.

(10) Patent No.: US 11,970,056 B2
(45) Date of Patent: Apr. 30, 2024

(54) PLASTIC TANK

(71) Applicant: MAGNA Energy Storage Systems GesmbH, Sinabelkirchen (AT)

(72) Inventors: Rainer Puchleitner, Graz (AT); Manuel Bauer, Graz (AT); Gregor Stiendl, St. Ruprecht (AT); Harald Humenberger, St. Ruprecht (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 239 days.

(21) Appl. No.: 17/675,362

(22) Filed: Feb. 18, 2022

(65) Prior Publication Data
US 2022/0281313 A1   Sep. 8, 2022

(30) Foreign Application Priority Data
Mar. 5, 2021   (EP) .................................... 21160925

(51) Int. Cl.
*B60K 15/03* (2006.01)
*B60K 15/04* (2006.01)

(52) U.S. Cl.
CPC ........ *B60K 15/03177* (2013.01); *B60K 15/04* (2013.01); *B60K 2015/03447* (2013.01); *B60K 2015/0346* (2013.01); *B60K 2015/03493* (2013.01)

(58) Field of Classification Search
CPC ........... B60K 2015/03243; B60K 2015/03467; B60K 15/03; B60K 2015/03493; B60K 15/03467; B60K 15/03177; F02M 37/103; B29D 22/003
See application file for complete search history.

(56) References Cited

U.S. PATENT DOCUMENTS

| | | | | |
|---|---|---|---|---|
| 4,974,570 A | * | 12/1990 | Szwargulski | B60K 15/06 123/514 |
| 5,044,526 A | * | 9/1991 | Sasaki | F02M 37/103 222/377 |
| 5,415,146 A | * | 5/1995 | Tuckey | F02M 37/106 137/113 |

(Continued)

FOREIGN PATENT DOCUMENTS

| CN | 202608553 U | 12/2012 |
|---|---|---|
| CN | 203995664 U | 12/2014 |

(Continued)

OTHER PUBLICATIONS

European Search Report, European Patent Application No. EP21160925.0 (dated Oct. 25, 2021).

(Continued)

*Primary Examiner* — Ernesto A Grano
(74) *Attorney, Agent, or Firm* — Jordan IP Law, LLC; Todd A. Vaughn

(57) ABSTRACT

A plastic tank for a motor vehicle. The plastic tank includes a container wall composed of plastic, an opening arranged in the container wall, a removable cover member operable to close and open the opening, and a stiffening ring member, composed of an injection-moulded plastic, embedded into an edge of the container wall that surrounds the opening, the stiffening ring member being operable to directly or indirectly support the cover member when the opening is closed.

19 Claims, 2 Drawing Sheets

(56) References Cited

U.S. PATENT DOCUMENTS

| | | | | |
|---|---|---|---|---|
| 5,647,329 A * | 7/1997 | Bucci | ...................... | F02M 37/50 |
| | | | | 123/509 |
| 5,826,918 A * | 10/1998 | Bowles | ............... | F16L 37/0985 |
| | | | | 285/24 |
| 5,931,353 A * | 8/1999 | Guyomard | ........... | B60K 15/077 |
| | | | | 417/423.15 |
| 6,283,731 B1 * | 9/2001 | Yoshioka | ........... | B01D 35/0273 |
| | | | | 137/574 |
| 6,499,500 B2 * | 12/2002 | Rosseel | ................... | B29C 51/34 |
| | | | | 137/15.17 |
| 6,923,164 B1 * | 8/2005 | Mitsudou | ............. | F02M 37/103 |
| | | | | 123/514 |
| 7,201,151 B2 * | 4/2007 | Hayakawa | ......... | F04D 13/0666 |
| | | | | 123/509 |
| 7,886,721 B2 * | 2/2011 | Sanden | ................ | B60K 15/077 |
| | | | | 123/509 |
| 7,992,546 B2 * | 8/2011 | Eck | ...................... | B60K 15/077 |
| | | | | 123/509 |
| 8,240,332 B1 * | 8/2012 | Matusek | .............. | F02M 37/106 |
| | | | | 137/565.17 |
| 9,061,580 B2 * | 6/2015 | Gardien | ........... | B60K 15/03519 |
| 10,145,341 B2 * | 12/2018 | Kim | ....................... | F02M 37/14 |
| 10,857,874 B2 * | 12/2020 | Ehler | ................ | B60K 15/03177 |
| 2002/0096522 A1 | 7/2002 | Palvoelgyi et al. | | |
| 2003/0141304 A1 * | 7/2003 | Franjo | ................... | B62D 33/00 |
| | | | | 220/562 |
| 2005/0194796 A1 * | 9/2005 | Powell | ................ | F02M 37/103 |
| | | | | 220/298 |
| 2011/0101006 A1 * | 5/2011 | Gardien | .......... | B60K 15/03177 |
| | | | | 220/669 |
| 2015/0053704 A1 * | 2/2015 | Hill | .................... | B01D 19/0031 |
| | | | | 96/6 |
| 2020/0276900 A1 | 9/2020 | Tabuchi et al. | | |

FOREIGN PATENT DOCUMENTS

| | | |
|---|---|---|
| CN | 204453241 U | 7/2015 |
| CN | 205674852 U | 11/2016 |
| CN | 107921863 A | 4/2018 |
| CN | 108136894 A | 6/2018 |
| CN | 108602429 A | 9/2018 |
| DE | 10 2010 032931 A1 | 2/2012 |
| DE | 102011105706 A1 | 12/2012 |

OTHER PUBLICATIONS

European Office Action for Application No. 21 160 925.0-1012 dated Jun. 30, 2023, 4 pages.

Chinese Search Report for Application No. 202210201857.4, dated Apr. 20, 2023, 10 pages.

* cited by examiner

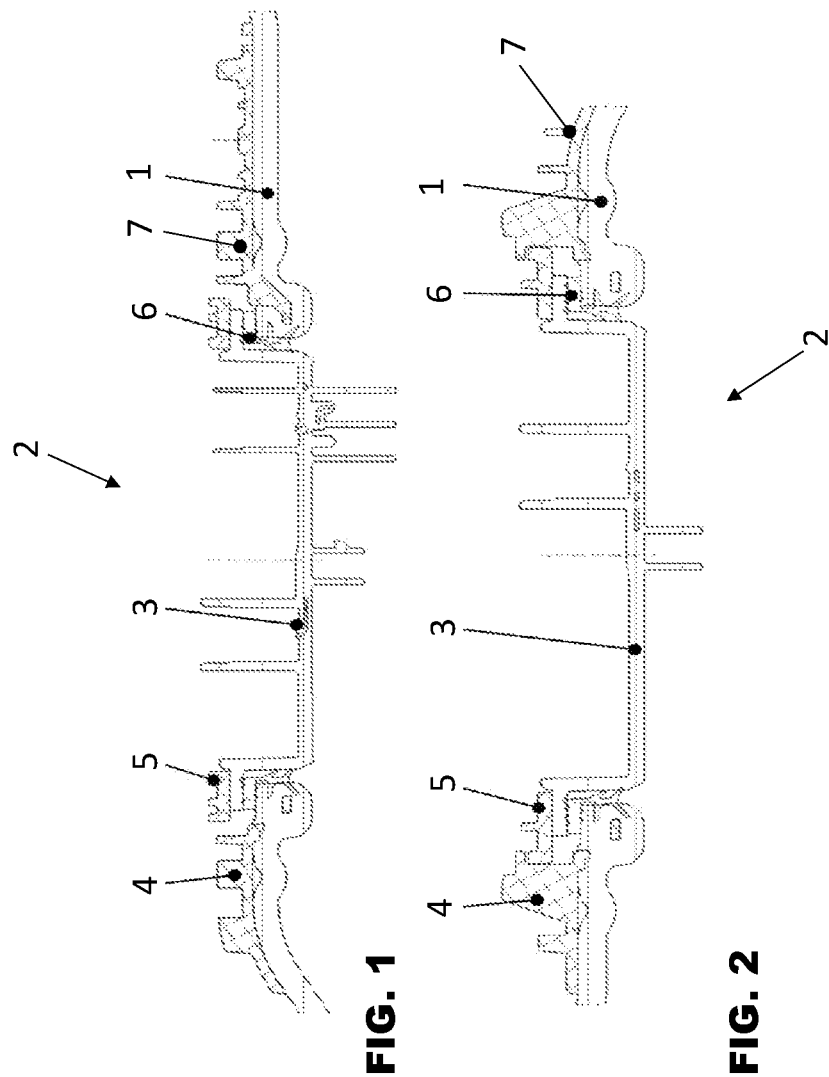

PLASTIC TANK

CROSS-REFERENCE TO RELATED APPLICATIONS

The present application claims priority under 35 U.S.C. § 119 to European Patent Publication No. EP 21160925.0 (filed on Mar. 5, 2021), which is hereby incorporated by reference in its complete entirety.

TECHNICAL FIELD

Embodiments relate to a plastic tank for a motor vehicle.

BACKGROUND

Currently, a process of producing tanks for motor vehicles, for example, fuel tanks, from plastic is known. Such plastic tanks can be produced in particular by thermoforming or blow moulding. The plastic tanks may have openings which can be closed via a cover member. In particular, plastic tanks may have a service opening so that the interior of the tank container remains accessible even after the production of the plastic tank.

A metal ring may be arranged at the edge of such an opening, in particular service opening, in order to provide the plastic container with the necessary stiffness to absorb the required closing forces when the cover member is being attached for the purpose of closing the opening. Such metal rings at openings of plastic tanks, however, usually have to be grounded since they can become electrostatically charged. Such metal rings also tend to be "pulled" from the tank relatively easily in the case of high pressure and high temperatures. It is therefore necessary to use further attachment parts to secure such a metal ring. As a result, the overall production of the tanks is complex and expensive.

SUMMARY

One or more embodiments are to provide a plastic tank for a motor vehicle, the plastic tank making it possible to reliably open and close an opening, in particular, a service opening, of the tank and being able to be produced in a simple and cost-effective manner in the process.

In accordance with one or more embodiments, a plastic tank for a motor vehicle may comprise a container wall composed of plastic, the container wall having an opening; a removable cover member that is operable to close and open the opening; a stiffening ring member embedded into an edge of the container wall and surrounding the opening, the stiffening ring member being composed of an injection-moulded plastic component, wherein the cover member is supported directly or indirectly by the stiffening ring member when the cover member is in a position to close the opening.

In accordance with one or more embodiments, a stiffening ring member composed of plastic is used to provide the required stiffness for the attachment of the cover member, i.e., to indirectly or directly support the cover member. The stiffening ring member is embedded into the plastic of the container wall, i.e., surrounded in a form-fitting manner by the plastic of the container at least in certain portions, such that the stiffening ring member is securely retained in the plastic of the container wall. The stiffening ring member is an injection-moulded component, with the result that the stiffening ring member can be formed with a geometry that ensures a high stiffness and optionally additional functions of the stiffening ring member in a simple manner.

The use of a plastics injection-moulded component makes it possible to dispense with grounding of the stiffening ring member. The embedding into the surrounding plastic also reduces the outlay and the number of components required to securely retain the stiffening ring member even in the case of relatively high pressure and temperature in the tank.

In accordance with one or more embodiments, the stiffening ring member may be embedded into the container wall on the outside/exterior at the edge of the opening, i.e., on the outer side of the container.

In accordance with one or more embodiments, at least a portion of the stiffening ring member is encapsulated by blow moulding or encapsulated by suction during the forming process of the container wall, i.e., during the production of the tank container, such that the stiffening ring member is embedded into the plastic of the container wall. The entire circumference of the stiffening ring member is encapsulated by blow moulding or encapsulated by suction and/or embedded into the plastic of the container wall.

In accordance with one or more embodiments, at least a portion of the stiffening ring member is fastened to the plastic of the container wall via a welding pad. The welding pad may be fixed in the plastic of the container wall. The stiffening ring member may be clamped between a surface of the welding pad and the plastic of the container wall.

In accordance with one or more embodiments, a bayonet ring member or threaded ring member, retained by the stiffening ring member, and operable to support the cover member when the opening is closed and to facilitate removal of the cover member when the opening is opened. The bayonet ring member may comprise a plastic component, such that, in that way, the grounding of the bayonet ring member to be dispensed with or otherwise unnecessary.

In accordance with one or more embodiments, a circumferential sealing member, in particular, a ring seal, may be mounted on the edge of the container wall that surrounds the opening. In that way, the sealing member seals between the cover member and the container wall when the cover member is attached. The sealing member may, at least in certain regions, lay substantially radially within the stiffening ring member, i.e., adjacent to the opening than the stiffening ring member.

In accordance with one or more embodiments, the stiffening ring member may have a stiffening geometric structure, in particular, stiffening honeycomb-like structures and/or stiffening ribs, in order to increase the stiffness of the component. In particular, the stiffening ring member may have at least one support for a tension anchor or pressure anchor. Anchor elements, which are arranged between the container walls to increase the strength of the container, can thus be supported on the stiffening ring member.

DRAWINGS

One or more embodiments will be illustrated by way of example in the drawings and explained in the description hereinbelow.

FIG. 1 illustrates a sectional view of a plastic tank in a region of the opening, in accordance with one or more embodiments.

FIG. 2 illustrates a sectional view of the plastic tank of FIG. 1.

DESCRIPTION

Figure 3:
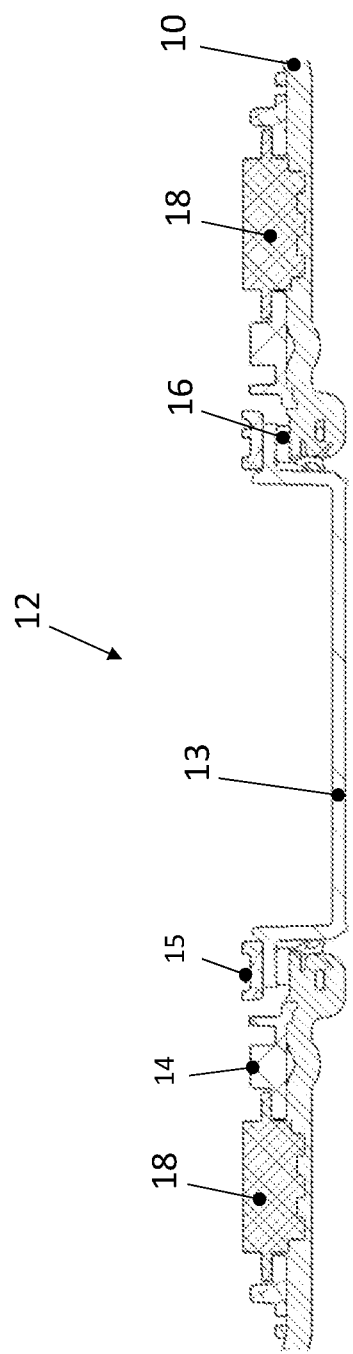
FIG. 3 illustrates a sectional view of a plastic tank in the region of the opening, in accordance with one or more embodiments.

FIGS. 1 and 2 illustrate, in accordance with one or more embodiments, a plastic tank in a region of an opening 2 (e.g., a service opening) in the tank, and thus, in a region of a stiffening ring member 4. The plastic tank comprises a container wall 1 composed of plastic, in particular, a thermoplastic such as high-density polyethylene (HDPE). Arranged in the container wall 1 is an opening 2 which is closed via a removable cover member 3.

A stiffening ring member 4 is embedded into the edge of the container wall 1, the edge surrounding the opening 2, into the plastic of the container wall, on the outside of the container. The stiffening ring member 4 is a plastics injection-moulded component. The cover member 3 is supported on the stiffening ring member 4, indirectly via a bayonet ring 5, when the opening 2 is closed. The stiffening ring member 4 has been encapsulated by blow moulding or encapsulated by suction during the forming process of the container wall 1, such that the stiffening ring member 4 is fully embedded into the plastic of the container wall 1.

The bayonet ring 5, retained by the stiffening ring member 4, and operable to support the cover member 3 when the opening 2 is closed and to facilitate removal of the cover member 3 when the opening 2 is opened. To this end, the bayonet ring 5 is engaged behind on the outside by the stiffening ring member 4 at least in certain regions, and thus, supported or loaded towards the container.

A circumferential sealing member 6, in particular, a flat ring seal, is mounted on the outside on the edge of the container wall 1 that surrounds the opening 2, such that the sealing member 6 forms a seal between the cover member 3 and the container wall 1 when the cover member 3 is attached. The sealing member 6 lies substantially radially within the stiffening ring member 4 on the container wall 1. The stiffening ring member 4 has a plurality of stiffening geometric structures 7, in particular, outwardly projecting stiffening ribs.

Figure 4:
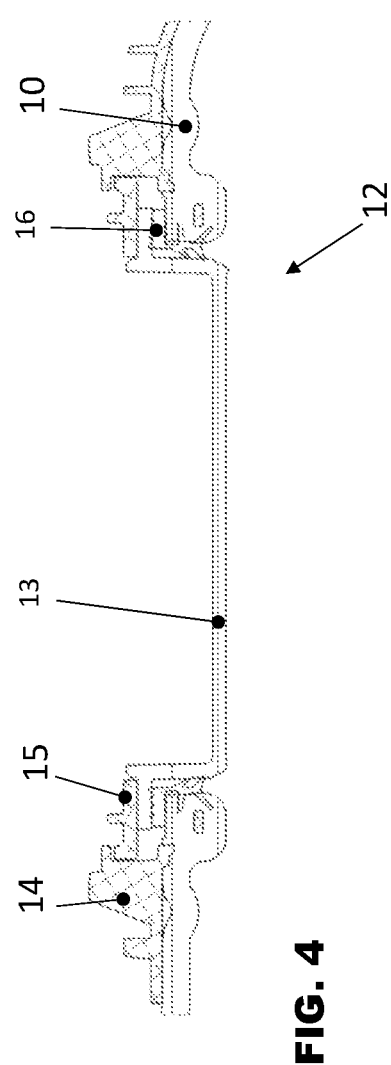
FIG. 4 illustrates a sectional view of the plastic tank of FIG. 3.

FIGS. 3 and 4 illustrate another embodiment of a plastic tank in a region of an opening 12 (e.g., a service opening) in the tank, and thus, in a region of a stiffening ring member 14. The plastic tank in accordance with this embodiment differs from the embodiment illustrated in FIGS. 1 and 2 in that portions of the stiffening ring member 14 are fastened to the plastic of the container wall 10 via a plurality of welding pad members 18. The welding pad members 18 are fixed in the plastic of the container wall 10, in particular, in a materially bonded and form-fitting manner. The stiffening ring member 14 is arranged, i.e., clamped, between surfaces formed by the welding pad members 18 and the plastic of the container wall 10. The embedding of the stiffening ring member 14 into the edge of the container wall 10 that surrounds the opening 12, is thus primarily effected indirectly via the welding pad members 18. The stiffening ring member 14 may for example be additionally embedded directly into the edge of the container wall 10 that surrounds the opening 12, only to a minor extent, or not at all.

LIST OF REFERENCE SYMBOLS 1, 10 Container wall
2, 12 Opening
3, 13 Cover member
4, 14 Stiffening ring member
5, 15 Bayonet ring
6, 16 Sealing member
7 Stiffening geometry
18 Welding pad

What is claimed is:

1. A plastic tank for a motor vehicle, the plastic tank comprising:
    a container wall composed of plastic;
    an opening arranged in the container wall;
    a removable cover member operable to close and open the opening; and
    a stiffening ring member, composed of an injection-moulded plastic, embedded into an edge of the container wall that surrounds the opening, the stiffening ring member being operable to directly or indirectly support the cover member when the opening is closed;
    a welding pad member, fixed in the container wall, and operable to fasten at least a portion of the stiffening ring member to the container wall; and
    a threaded ring member, retained by the stiffening ring member, and operable to support the cover member when the opening is closed and facilitate removal of the cover member when the opening is opened.

2. The plastic tank of claim 1, wherein the stiffening ring member is embedded into the container wall on an outside edge of the opening.

3. The plastic tank of claim 1, wherein at least a portion of the stiffening ring member is encapsulated by blow moulding or encapsulated by suction during formation of the container wall, such that the stiffening ring member is embedded into the plastic of the container wall, preferably the entire circumference of the stiffening ring member.

4. The plastic tank of claim 1, wherein an entire circumference of the stiffening ring member of the stiffening ring member is encapsulated by blow moulding or encapsulated by suction during formation of the container wall, such that the stiffening ring member is embedded into the plastic of the container wall.

5. The plastic tank of claim 1, further comprising a bayonet ring member, retained by the stiffening ring member, and operable to support the cover member when the opening is closed and to facilitate removal of the cover member when the opening is opened.

6. The plastic tank of claim 1, further comprising a threaded ring member, retained by the stiffening ring member, and operable to support the cover member when the opening is closed and to facilitate removal of the cover member when the opening is opened.

7. The plastic tank of claim 1, further comprising a circumferential seal member, mounted on an edge of the container wall that surrounds the opening, and operable to form a seal between the cover member and the container wall when the cover member closes the opening.

8. The plastic tank of claim 7, wherein the circumferential seal member lies radially within the stiffening ring member.

9. The plastic tank of claim 1, wherein the stiffening ring member has a plurality of stiffening honeycomb-like structures and/or stiffening ribs.

10. The plastic tank of claim 1, wherein the stiffening ring member has at least one support for a tension or pressure anchor.

11. A plastic tank for a motor vehicle, the plastic tank comprising:
    a container wall composed of plastic;
    an opening arranged in the container wall;
    a removable cover member operable to close and open the opening;

a stiffening ring member, composed of an injection-moulded plastic, embedded into an edge of the container wall that surrounds the opening, the stiffening ring member being operable to directly or indirectly support the cover member when the opening is closed;

a welding pad member, fixed in the container wall, and operable to fasten at least a portion of the stiffening ring member to the container wall; and a bayonet ring member, retained by the stiffening ring member, and operable to support the cover member when the opening is closed and facilitate removal of the cover member when the opening is opened.

12. The plastic tank of claim 11, wherein the stiffening ring member is clamped between a surface of the welding pad and the surface of the container wall.

13. The plastic tank of claim 11, wherein the stiffening ring member is embedded into the container wall on an outside edge of the opening.

14. The plastic tank of claim 11, wherein an entire circumference of the stiffening ring member of the stiffening ring member is encapsulated by blow moulding or encapsulated by suction during formation of the container wall, such that the stiffening ring member is embedded into the plastic of the container wall.

15. The plastic tank of claim 11, further comprising a circumferential seal member, mounted on an edge of the container wall that surrounds the opening, and operable to form a seal between the cover member and the container wall when the cover member closes the opening.

16. The plastic tank of claim 15, wherein the circumferential seal member lies radially within the stiffening ring member.

17. The plastic tank of claim 11, wherein the stiffening ring member has a plurality of stiffening honeycomb-like structures and/or stiffening ribs.

18. The plastic tank of claim 11, wherein the stiffening ring member has at least one support for a tension or pressure anchor.

19. A plastic tank for a motor vehicle, the plastic tank comprising:

a container wall having an opening surrounded by an edge of the container wall;

a removable cover member operable to close and open the opening;

a stiffening ring member, embedded into the edge of the container wall, and operable to directly or indirectly support the cover member when the opening is closed;

a welding pad member, arranged in the container wall, and operable to fasten the stiffening ring member to the container wall; and a bayonet ring member, retained by the stiffening ring member, and operable to support the cover member when the opening is closed and facilitate removal of the cover member when the opening is opened.

* * * * *